(12) United States Patent
Su

(10) Patent No.: US 10,270,649 B2
(45) Date of Patent: Apr. 23, 2019

(54) SYSTEM AND METHOD FOR IMPROVED SERVER MODULE ADDRESSING

(71) Applicant: QUANTA COMPUTER INC., Taoyuan (TW)

(72) Inventor: Chin-Lung Su, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 23 days.

(21) Appl. No.: 15/481,096

(22) Filed: Apr. 6, 2017

(65) Prior Publication Data
US 2018/0295018 A1    Oct. 11, 2018

(51) Int. Cl.
H04L 12/28 (2006.01)
H04L 12/24 (2006.01)

(52) U.S. Cl.
CPC .......... *H04L 41/0803* (2013.01); *H04L 41/12* (2013.01)

(58) Field of Classification Search
CPC . H04B 17/003; H04L 12/41; H04L 29/06333; H04L 29/12009; H04L 29/12207; H04L 29/12264; H04L 43/08; H04L 43/0852; H04L 43/50; G06F 13/40; G06F 13/409
See application file for complete search history.

(56) References Cited

U.S. PATENT DOCUMENTS

| | | | | |
|---|---|---|---|---|
| 9,325,664 | B2* | 4/2016 | Yu | H04L 61/2007 |
| 2003/0105904 | A1* | 6/2003 | Abbondanzio | G06F 13/409 |
| | | | | 710/302 |
| 2006/0265449 | A1 | 11/2006 | Uemura et al. | |
| 2009/0157941 | A1* | 6/2009 | Bolan | H04L 41/0886 |
| | | | | 711/6 |

FOREIGN PATENT DOCUMENTS

TW    201142612 A    12/2011

OTHER PUBLICATIONS

Taiwanese Office Action for Application No. 106123090, dated Mar. 31, 2018, w/ First Office Action Summary.
Taiwanese Search Report for Application No. 106123090, (conducted Feb. 24, 2018) dated Mar. 31, 2018.
PCA9547, 8-channel I2C-bus multiplexer with reset; NXP Semiconductors, BUS, Product data sheet; Rev. 4—Apr. 1, 2014, pp. 1-30.

* cited by examiner

*Primary Examiner* — Frank Duong
(74) *Attorney, Agent, or Firm* — Nixon Peabody LLP; Zhou Lu

(57) ABSTRACT

The present disclosure relates to an apparatus having a computing device with a plurality of serial transmit pins corresponding to a plurality of module locations and methods performed thereon. The computing device is configured to perform operations including selecting a module location from the plurality of module locations, to yield a selected module location and repeating: transmitting, via a one of the plurality of serial transmit pins corresponding to the selected module location, an address for the selected module location; and updating the selected module location to correspond to a next module location of the plurality of module locations.

20 Claims, 5 Drawing Sheets

SYSTEM AND METHOD FOR IMPROVED SERVER MODULE ADDRESSING

BACKGROUND

1. Technical Field

The present disclosure relates to addressing of server modules and more specifically to reducing the number of pins required for addressing of server modules.

2. Introduction

Modular server designs can provide improved flexibility with regards to function, operation, power management, and repair. However, these improvements come at a cost of having to connect, communicate, and at times restore communications on a module-by-module basis. For example, every time a new blade is inserted into a blade server, the server must identify the address which will be used for that blade, communicate the address to the blade, and ensure the blade will effectively communicate with the server. In other configurations (such as configurations where the blade has particular configurations or functions), the address of the blade can be specific to the blade, such that if the blade were to move locations within the server (or be moved to another server), the address for the blade remains the same.

To establish communications between the removable modules and the server, servers and modules typically have a number of pins used exclusively for identification purposes, where the number of pins corresponds to the maximum number of modules which can be housed in the server. More specifically, the number of pins required for module identification generally operates on a "base-two" requirement, such that if a server can hold eight modules ($2^3$), three pins are required, whereas if a server can hold up to 32 modules ($2^5$), five pins are required. Because of this, the number of input/output pins of the module which are dedicated to module identification and addressing must increase as the capacity of the server increases. Increasing the number of pins dedicated to module identification in turn reduces total bandwidth and capacity for other communications between the server and the server module.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In a first embodiment, there is provided an apparatus including a computing device with a plurality of serial transmit pins corresponding to a plurality of module locations. The computing device configured to perform operations comprising: selecting a module location from the plurality of module locations, to yield a selected module location, and repeating: transmitting, via a one of the plurality of serial transmit pins corresponding to the selected module location, an address for the selected module location and updating the selected module location to correspond to a next module location of the plurality of module locations.

The computing device can further include a plurality of serial receive pins corresponding to the plurality of module locations and, and wherein the repeating further comprises receiving, via a one of the plurality of serial receive pins corresponding to the selected module location, a confirmation of a receipt of the serial address transmitted via the one of the plurality of serial transmit pins corresponding to the selected module location.

In the apparatus, the repeating can further include performing, prior to the transmitting and the updating, operations including: determining that no computing module is associated with the selected module location, and that in response to determining that no computing module is associated with the selected module location, skipping the transmitting and performing only the updating during the repeating.

In the apparatus, the address for the selected module location can be predefined for the selected module location.

In the apparatus, the computing device can also include a location dispatch microcontroller having a plurality of select pins configured for outputting a representation of the selected module location and an address output pin for generating the address corresponding to the selected module location, and a multiplexer and configured for selectively coupling the address output pin to one of the plurality of serial transmit pins based on the representation at the plurality of select pins.

The apparatus can also include a plurality of module dock connectors corresponding to the plurality of module locations, wherein each of the plurality of module dock connectors is adapted to receive a computing module. The computing module can be a server blade.

Further, each of the plurality of module dock connectors further can have a first pin coupled to one of the plurality of serial transmit pins and a plurality of other pins for data communication with the computing module.

In the apparatus, the computing device can be at least one of a microcontroller or a Field Programmable Gate Array (FPGA). Further, the apparatus can include a Universal Asynchronous Receiver/Transmitter for the transmitting of the serial address.

In a second embodiment a method is provided. The method includes selecting a module location from a plurality of module locations, to yield a selected module location, and repeating: transmitting, via a one of a plurality of serial transmit pins corresponding to the selected module location, an address for the selected module location and updating the selected module location to correspond to a next module location of the plurality of module locations.

In the method, the repeating can further include receiving, via a one of a plurality of serial receive pins corresponding to the selected module location, a confirmation of a receipt of the serial address transmitted via the one of the plurality of serial transmit pins corresponding to the selected module location. The repeating can also include performing, prior to the transmitting and the updating, the steps of determining that no computing module is associated with the selected module location and, in response to determining that no computing module is associated with the selected module location, skipping the transmitting and performing only the updating during the repeating.

In the method, the address for the selected module location can be predefined for the selected module location.

The repeating in the method can further include outputting, via a plurality of select pins, a representation of the selected module location, generating the address via an address output pin corresponding to the selected module location, and selectively coupling the address output pin to one of the plurality of serial transmit pins based on the representation at the plurality of select pins.

In a third embodiment, there is provided a computer-readable storage device having instructions stored which, when executed by a computing device, cause the computing device to perform operations including selecting a module location from a plurality of module locations, to yield a selected module location, and repeating: transmitting, via a one of a plurality of serial transmit pins corresponding to the selected module location, an address for the selected module location and updating the selected module location to correspond to a next module location of the plurality of module locations.

In the computer-readable storage device, the repeating can further include receiving, via a one of a plurality of serial receive pins corresponding to the selected module location, a confirmation of a receipt of the serial address transmitted via the one of the plurality of serial transmit pins corresponding to the selected module location.

The repeating can also include, prior to the transmitting and the updating: determining that no computing module is associated with the selected module location and in response to determining that no computing module is associated with the selected module location, skipping the transmitting and performing only the updating during the repeating.

In the computer-readable storage device, the address for the selected module location can be predefined for the selected module location.

In computer-readable storage device, the repeating can further include: outputting, via a plurality of select pins, a representation of the selected module location, generating the address via an address output pin corresponding to the selected module location and selectively coupling the address output pin to one of the plurality of serial transmit pins based on the representation at the plurality of select pins.

DETAILED DESCRIPTION

A system, method and computer-readable media are disclosed which improve server module addressing. Rather than requiring a $2^N$ number of pins be dedicated for addressing a plurality of modules, the disclosed systems and methods allow for addressing to be conducted via a two pin system made up of a single transmit (Tx) pin and a single receive (Rx) pin associated with each of the plurality of modules. Addressing, in this manner can be conducted through various embodiments and configurations, which are described in detail below. While specific implementations are described, it should be understood that this is done for illustration purposes only. Other components and configurations may be used without parting from the spirit and scope of the disclosure.

Figure 1:
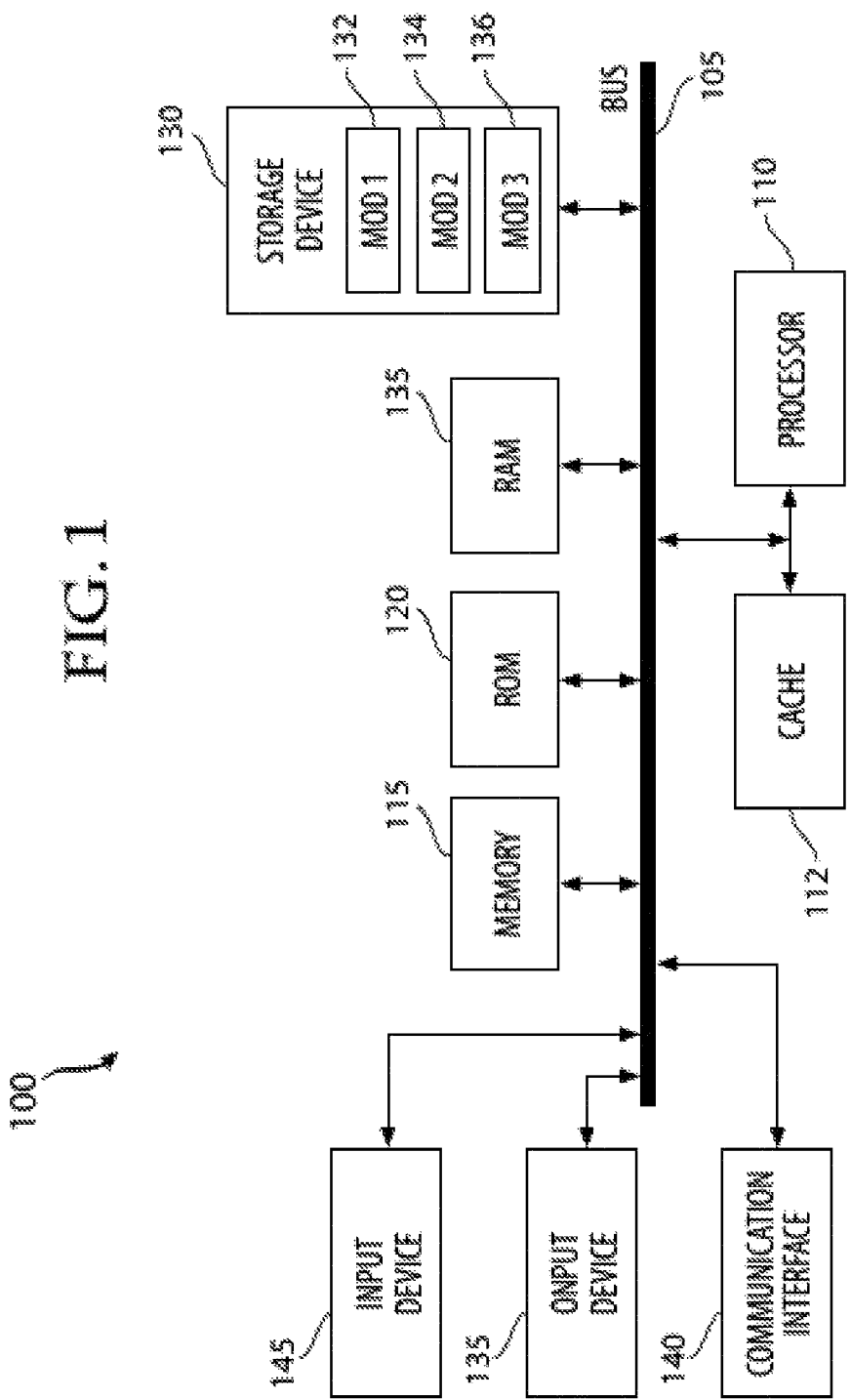
FIG. 1 illustrates an example system embodiment.

A brief introductory description of a basic general purpose system or computing device in FIG. 1 which can be employed to practice the concepts is disclosed herein. A more detailed description of the improved addressing of server modules will then follow. The disclosure now turns to FIG. 1.

With reference to FIG. 1, an exemplary system 100 includes a general-purpose computing device, including a processing unit (CPU or processor) 110 and a system bus 105 that couples various system components including the system memory 115 such as read only memory (ROM) 120 and random access memory (RAM) 135 to the processor 110. The system 100 can include a cache 112 of high speed memory connected directly with, in close proximity to, or integrated as part of the processor 110. The system 100 copies data from the memory 115 and/or the storage device 130 to the cache 112 for quick access by the processor 110. In this way, the cache provides a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

The system bus 105 may be any of several types of bus structures including a memory bus or memory controller, a peripheral bus, and a local bus using any of a variety of bus architectures. A basic input/output (BIOS) stored in ROM 120 or the like, may provide the basic routine that helps to transfer information between elements within the computing device 100, such as during start-up. The computing device 100 further includes storage devices 130 such as a hard disk drive, a magnetic disk drive, an optical disk drive, or tape drive. The storage device 130 can include software modules 132, 134, 136 for controlling the processor 110. Other hardware or software modules are contemplated. The storage device 130 is connected to the system bus 105 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 110, bus 105, display 135, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 130, other types of computer-readable media which can store data that are accessible by a computer, such as magnetic cassettes, flash memory cards, digital versatile disks, cartridges, random access memories (RAMs) 135, and read only memory (ROM) 120, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 may be provided by a single shared processor or multiple processors. Illustrative embodiments may include microprocessor and/or digital signal processor (DSP) hardware, read-only memory (ROM) 120 for storing software performing the operations described below, and random access memory (RAM) 135 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 135 or memory 115 at runtime or may be stored in other computer-readable memory locations.

Figure 2:
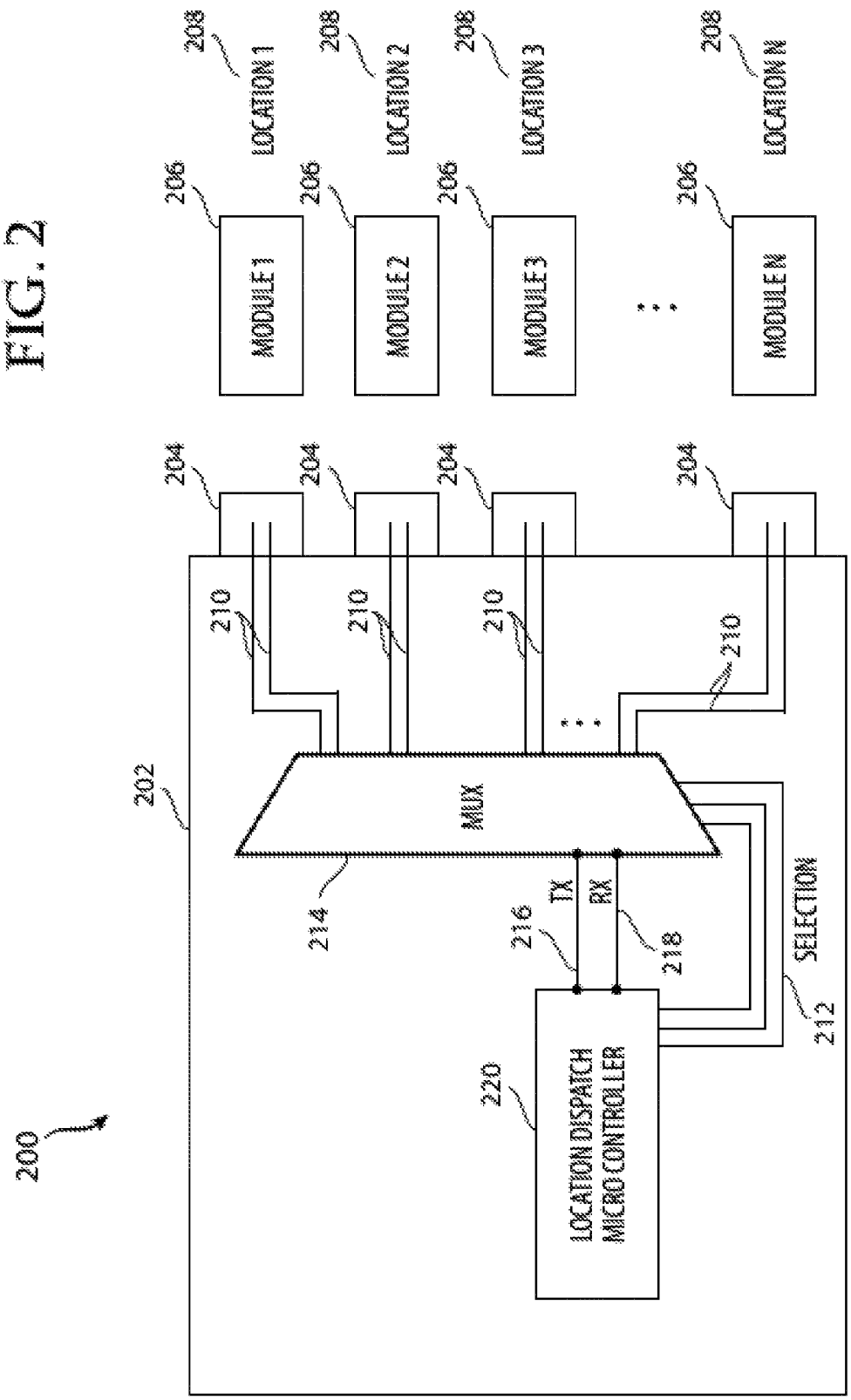
FIG. 2 illustrates an example server having multiple modules.

Having disclosed some components of a computing system, the disclosure now turns to FIG. 2, which illustrates 200 an example server 202 having multiple modules 206. In most cases, the modules 206 will be individual blades being inserted into a blade server (or a blade-like server). In other cases, the modules can be any individual computing piece inserted into a server as part of a modular system. However, modules can also exist in non-modular server systems, where the individual modules represent isolated or semi-isolated processing units within a server. These processing units can include FPGAs, ASICs, processors, and other integrated circuits.

Each module 206 in the server can have multiple pins and/or connectors used for receiving and transmitting information. For example, some modules could connect to the server 202, and communicate with the server 202, using five pins, and other modules could connect using fifty pins. However, as noted above, in a conventional blade server, it is typically necessary to dedicate a large portion of such pins for addressing purposes. In contrast, the present disclosure contemplates eliminating the need for a high number of addressing pins. Rather, the present disclosure contemplates configuring the server and a module (such as a server blade) to communicate address information serially via a single transmit line and a single receive line. Although transmitting information serially would technically be slower than a traditional multi-pin configuration, the limited amount of information involved in such a data exchange would not result in any significant delays in address assignment. As such, the number of pins required for addressing purposes can be significantly reduced with any impact to server performance. Moreover, the present disclosure also contemplates simplifying other communications between the server 202 and the modules 206, which would further reduce any potential latency issues.

As shown in FIG. 2, the server 202 can be configured to include a location dispatch microcontroller 220 which sends address information to the modules 206 connected to the server 202 via a transmit (Tx) line 216 and receives information via a receive (Rx) line 218. The modules 206 can be similarly configured. That is, they include each a corresponding transmit (Tx) line for transmitting information and a receive (Rx) line for receiving information, as described below with respect to FIG. 3.

In some configurations, an UART (Universal Asynchronous Receiver/Transmitter), can be used for translating data between parallel and serial forms. For example, the location dispatch microcontroller 220 can send and/or receive all data in a parallel form and use the UART to translate data in a serial format. In some configurations, the UART can be integrated into the location dispatch microcontroller 220.

Although the present disclosure contemplates that the location dispatch microcontroller 220 could have dedicated Tx and Rx lines coupled to corresponding lines at the modules 206, in other configurations a multiplexer ("mux") 214 can be used to simplify operation of the location dispatch microcontroller 220. That is, the location dispatch microcontroller 220 can be configured to communicate with modules 206 through the multiplexer ("mux") 214. In such a configuration, the location dispatch microcontroller 220 selects which of modules 206 to communicate with by configuring the output of selection wires 212 coupled to the mux 214. The number of selection wires 212 between the location dispatch microcontroller 220 can be $2^N$, such that if there are four or less ($2^2$) modules, two wires can be required, if there are eight ($2^3$) modules, three wires can be required, etc.

The mux 214 has two wires 210 connecting to the sockets 204 for each module 206. The two wires 210 correspond to the Tx 216 and Rx 218 lines from the location dispatch microcontroller 220, such that when the selection lines 212 indicate the location dispatch microcontroller 220 is going to transmit and/or receive data with a specific module, the data being communicated on the Tx/Rx lines 216, 218 goes through the corresponding two lines 210 for the selected module.

Each module 206 can be plugged into sockets 204 on the server 202, where each of sockets 204 is associated with location information 208, i.e., address information. In certain embodiments, each of sockets 204 has a predefined, fixed address which remains with each one of the sockets 204 even when no active module is detected at the one of the sockets 204. For example, if one of sockets 204 has an address "0x01010" and no module is plugged thereto or the module is powered off, the one of sockets 204 would retain the "0x01010" address for any module activated at the one of the sockets.

Therefore, in operation, the server 202 via, the location dispatch microcontroller 220, would select one of modules 206, configure the selection wires 212 accordingly to configure mux 214, and exchange address information with the one of the modules 206 via mux 214. In such a configuration, the address information from server 202 can overwrite any previously stored addresses in the modules 206.

Figure 3:
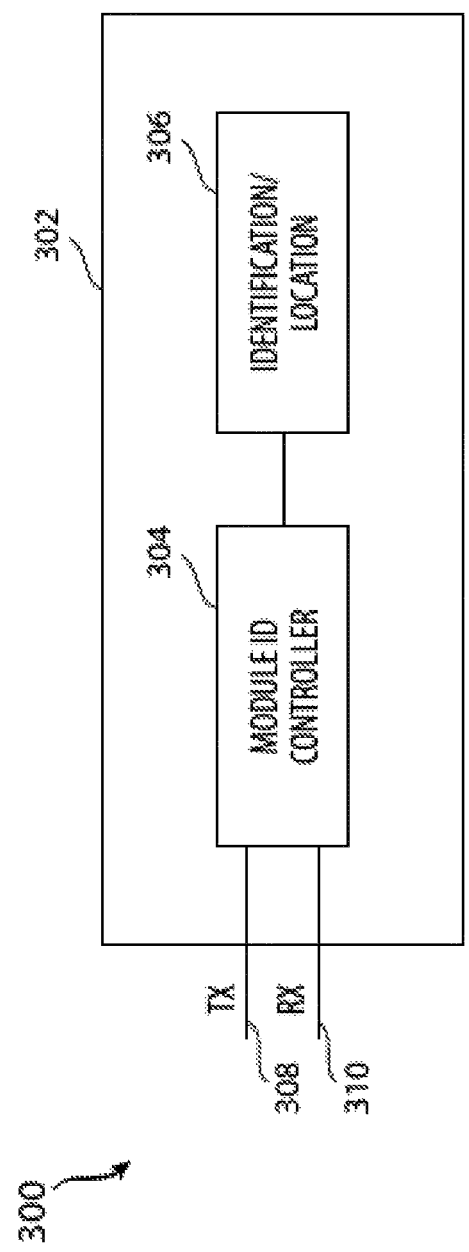
FIG. 3 illustrates an exemplary module.

FIG. 3 illustrates an exemplary module configuration 300 for each of modules 206 in FIG. 2. In module configuration 300, the physical module 302 contains a Tx pin 308 and an Rx pin 310, each of which are connected to a module identification (ID) controller 304. Within the physical module 302, the module identification/address/location 306 is also stored. The identification 306 can be recorded in a computer-readable storage medium, such as a hard drive, an integrated circuit design (such as RAM or DRAM chip), etc.

Figure 4:
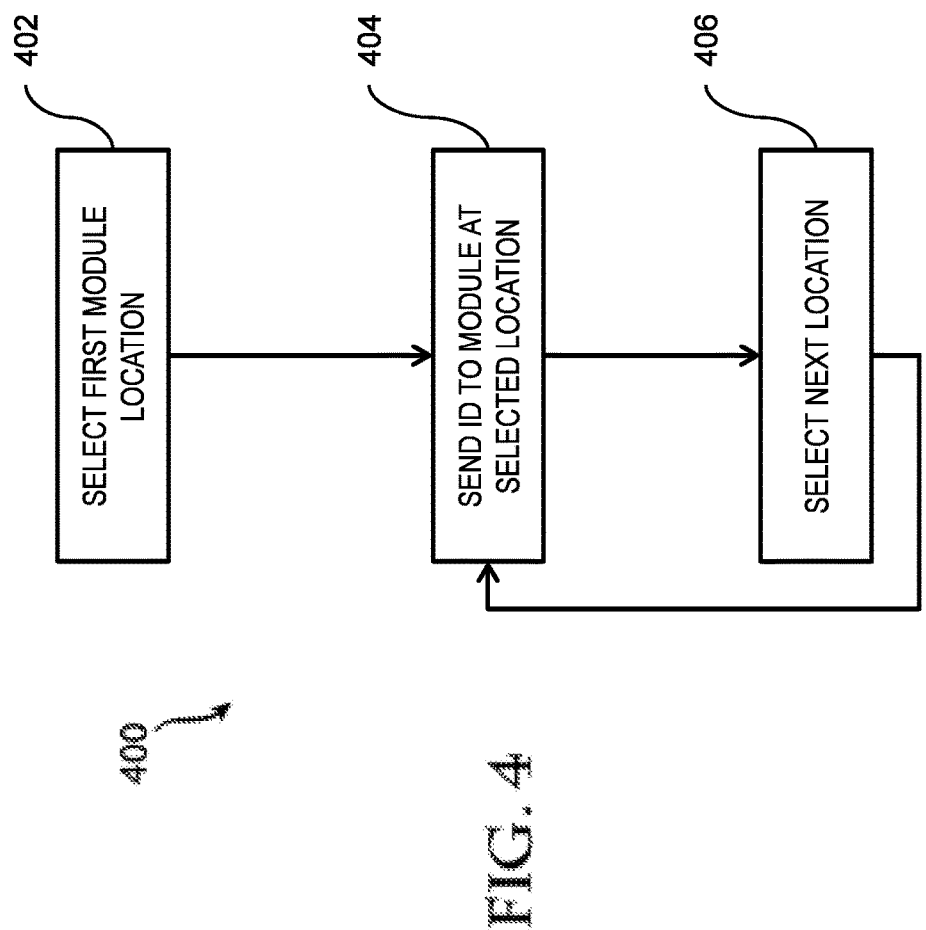
FIG. 4 illustrates a first exemplary method embodiment.

Having disclosed some basic system components and concepts, the disclosure now turns to the first exemplary method embodiment shown in FIG. 4. The steps outlined herein are exemplary and can be implemented in any combination thereof, including combinations that exclude, add, or modify certain steps.

As noted above, the present disclosure contemplates that address communications between a server and any modules connected thereto occur via serial communications. However, in many conventional blade servers, the server is also configured to detect when a blade is inserted therein. This is also a reason for some of the additional pins required. That is, the additional pins can be used to signal to the blade server when a blade has been inserted and/or to transmit requests from a blade for address information. The present disclosure contemplates that such a configuration is unnecessary. Rather, the server can instead use a repeating loop methodology to continuously provide address information for any modules connected thereto. This methodology is illustrated below with respect to FIG. 4.

The method of FIG. 4 begins by the server selecting a first module location (402) at the server. Referring back to FIG. 2, this means the location dispatch microcontroller 220 selects a first of sockets 204. The server then sends an identification to the selected module (404). That is, the address to be associated with the selected module location is transmitted to the module associated with the location. For example, referring back to FIG. 2, the location dispatch microcontroller 220 configures the select wires 212 to cause mux 214 to connect Tx and Rx lines 216 and 218 to be coupled to the corresponding lines of the first of sockets 204 and thereafter the address is serially transmitted to the one of modules 206 at the one of sockets 204 via Tx line 216. The server then selects the next module location (406), at which point the method is iteratively repeated. That is, all module locations are continually processed. In this manner, it is unnecessary to actively monitor the sockets for changes. Rather, the loop in method 400 would attend to continuously updating the addresses at all modules connected to the server, including any newly connected modules.

However, the present disclosure contemplates that if the server can detect a change at a particular location, the methods described herein can be modified so that the particular location can be the next selected location. For example, a module could provide a "heartbeat" signal when powered on and the server could be configured to detect such a signal and cause a location dispatch microcontroller to switch to the location associated with such a signal. In a particular configuration, a module could be configured to transmit such a signal via its Rx line. In such a configuration, the mux 214 or other component could have circuitry or other means for detecting a signal from the Rx line of a module and signal the location dispatch microcontroller accordingly.

Figure 5:
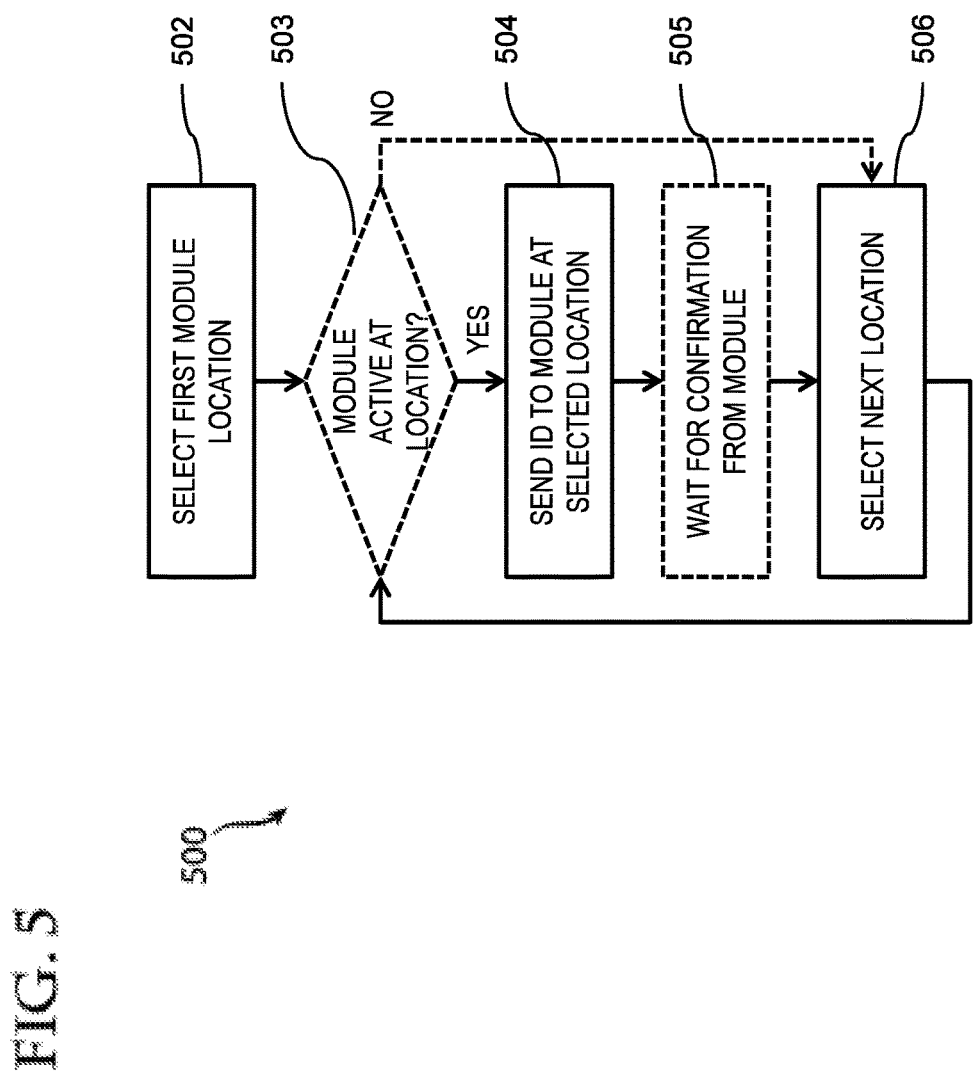
FIG. 5 illustrates a second exemplary method embodiment.

FIG. 5 illustrates a second exemplary method embodiment. The steps outlined herein are exemplary and can be implemented in any combination thereof, including combinations that exclude, add, or modify certain steps.

Although the method of FIG. 4 is adequate for most circumstances, in some configurations, the method can be modified to provide additional efficiency and reliability. For example, referring now to FIG. 5, a method 500 is shown therein that is substantially similar to that of FIG. 4. That is, method 500 includes steps 502, 504, and 506, which are substantially similar to steps 402, 404, and 406 in FIG. 4. Accordingly, the description of steps 402, 404, and 406 is sufficient for describing steps 502, 504, and 506 in FIG. 5. However, method 500 includes additional optional steps to improve the method of FIG. 4.

As noted above, it may be useful to improve efficiency of the methods described herein. Thus, the present disclosure contemplates that it may be useful to limit transmission of address information solely to modules currently active in the server. Thus, in method 500 this is handled by following selection of a module location (502 or 506) by determining whether a module is active at the selected location (503). This can be done in various ways. For example, as noted above, the server can be configured to detect a heartbeat signal or other signal indicating a module is active. Moreover, the server could also be configured whether the module is ready to receive address information. Regardless of how an active module is detected, in the event that no active module is detected at the location ("NO" at 503), the method can skip transmission of the ID (504) and proceed directly to selecting the next location (506). In the event that an active module is detected ("YES" at 503), the method can proceed to transmission of the ID (504) and proceed normally for the selected location.

As also noted above, it may also be useful to improve reliability. One method of doing so is incorporating a confirmation step. That is, rather than transmit the ID and move on to the next location, the present disclosure contemplates that the server can wait for a confirmation from the module prior to proceeding to process the next location. Referring back to FIG. 5, this can be implemented by performed by including a step to await for a confirmation from the module (505) after the ID is transmitted (504) and prior to proceeding to selecting the next location (506).

In some cases, it is possible that some error will cause no confirmation to be sent by an addressed module. Thus, the present disclosure contemplates that a timer can be implemented to cause the server to time out and allow the next location to be selected. In such cases, the server can also be configured to take corrective action. For example, rather than selecting the next location, the ID can be retransmitted to the same location and the server can await for the confirmation for the new transmission. In another example, the server can make note of the failure and cause the socket to be deactivated. In still another example, the server can be configured to cause an alarm to be activated and cause a technician or administrator to be informed of the issue. In still another example, the server can be configured to cause the module to be rebooted. Moreover, a combination of these actions can be implemented.

While the examples and embodiments described above are generally applicable to servers and modules for servers, the concepts can similarly be applied to any modular device which a computing device communicates with and which has an address for those communications. Examples of such devices include removable memory, graphic cards, sound cards, and peripheral devices.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein to any type of modular server, such as but not limited to blade servers. Various modifications and changes may be made to the principles described herein without following the example embodiments and applications illustrated and described herein, and without departing from the spirit and scope of the disclosure.

I claim:

1. An apparatus, comprising:
a computing device with a plurality of serial transmit pins corresponding to a plurality of module locations, the computing device configured to perform operations comprising:
selecting a module location from the plurality of module locations, to yield a selected module location; and
repeating:
transmitting, via one of a universal asynchronous receiver/transmitter (UART) or a multiplexer (MUX), and at least one serial transmit pin corresponding to the selected module location, an address for the selected module location to a socket corresponding to the selected module location; and
updating the selected module location to correspond to a next module location of the plurality of module locations.

2. The apparatus of claim 1, the computing device further comprising a plurality of serial receive pins corresponding to the plurality of module locations and, wherein the repeating further comprises receiving, via at least one serial receive pin corresponding to the selected module location, a confirmation of a receipt of a serial address transmitted via the at least one serial receive pin corresponding to the selected module location.

3. The apparatus of claim 1, the repeating further comprising, prior to the transmitting and the updating, performing operations comprising:
determining that no computing module is associated with the selected module location, and
in response to determining that no computing module is associated with the selected module location, skipping the transmitting and performing only the updating during the repeating.

4. The apparatus of claim 1, wherein the address for the selected module location is predefined for the selected module location.

5. The apparatus of claim 1, wherein the computing device comprises:
a location dispatch microcontroller comprising a plurality of select pins configured for outputting a representation of the selected module location and an address output pin for generating the address corresponding to the selected module location, and
the multiplexer and configured for selectively coupling the address output pin to one of the plurality of serial transmit pins based on the representation at the plurality of select pins.

6. The apparatus of claim 1, further comprising a plurality of module dock connectors corresponding to the plurality of module locations, wherein each of the plurality of module dock connector is adapted to receive a computing module.

7. The apparatus of claim 6, wherein the computing module is a server blade.

8. The apparatus of claim 6, wherein each of the plurality of module dock connectors further comprises a first pin coupled to one of the plurality of serial transmit pins and a plurality of other pins for data communication with the computing module.

9. The apparatus of claim 1, wherein the computing device comprises at least one of a microcontroller or a Field Programmable Gate Array (FPGA).

10. The apparatus of claim 1, further comprising UART for the transmitting of the serial address.

11. A method comprising:
selecting a module location from a plurality of module locations, to yield a selected module location; and
repeating:
transmitting, via one of a universal asynchronous receiver/transmitter (UART) or a multiplexer (MUX), and at least one serial transmit pin corresponding to the selected module location, an address for the selected module location to a socket corresponding to the selected module location; and
updating the selected module location to correspond to a next module location of the plurality of module locations.

12. The method of claim 11, wherein the repeating further comprises receiving, via at least one serial receive pin corresponding to the selected module location, a confirmation of a receipt of a serial address transmitted via the at least one serial receive pin corresponding to the selected module location.

13. The method of claim 11, wherein the repeating further comprises, prior to the transmitting and the updating:
determining that no computing module is associated with the selected module location, and
in response to determining that no computing module is associated with the selected module location, skipping the transmitting and performing only the updating during the repeating.

14. The method of claim 11, wherein the address for the selected module location is predefined for the selected module location.

15. The method of claim 11, wherein the repeating further comprises:
outputting, via a plurality of select pins, a representation of the selected module location, generating the address via an address output pin corresponding to the selected module location, and
selectively coupling the address output pin to one of e plurality of serial transmit pins based on the representation at the plurality of select pins.

16. A non-transitory computer-readable storage device having instructions stored which, when executed by a computing device, cause the computing device to perform operations comprising:
selecting a module location from a plurality of module locations, to yield a selected module location; and
repeating:
transmitting, via one of a universal asynchronous receiver/transmitter (UART) or a multiplexer (MUX), and at least one serial transmit pin corresponding to the selected module location, an address for the selected module location to a socket corresponding to the selected module location; and
updating the selected module location to correspond to a next module location of the plurality of module locations.

17. The non-transitory computer-readable storage device of claim 16, wherein the repeating further comprises receiving, via at least one serial receive pin corresponding to the selected module location, a confirmation of a receipt of a serial address transmitted via the at least one serial receive pin corresponding to the selected module location.

18. The non-transitory computer-readable storage device of claim 16, wherein the repeating further comprises, prior to the transmitting and the updating:
determining that no computing module is associated with the selected module location, and
in response to determining that no computing module is associated with the selected module location, skipping the transmitting and performing only the updating during the repeating.

19. The non-transitory computer-readable storage device of claim 16, wherein the address for the selected module location is predefined for the selected module location.

20. The non-transitory computer-readable storage device of claim 16, wherein the repeating further comprises:
outputting, via a plurality of select pins, a representation of the selected module location, generating the address via an address output pin corresponding to the selected module location, and
selectively coupling the address output pin to one of the plurality of serial transmit pins based on the representation at the plurality of select pins.

* * * * *